Aug. 26, 1941.  C. R. PATON  2,253,646
MOTOR VEHICLE
Filed May 7, 1938  2 Sheets-Sheet 1
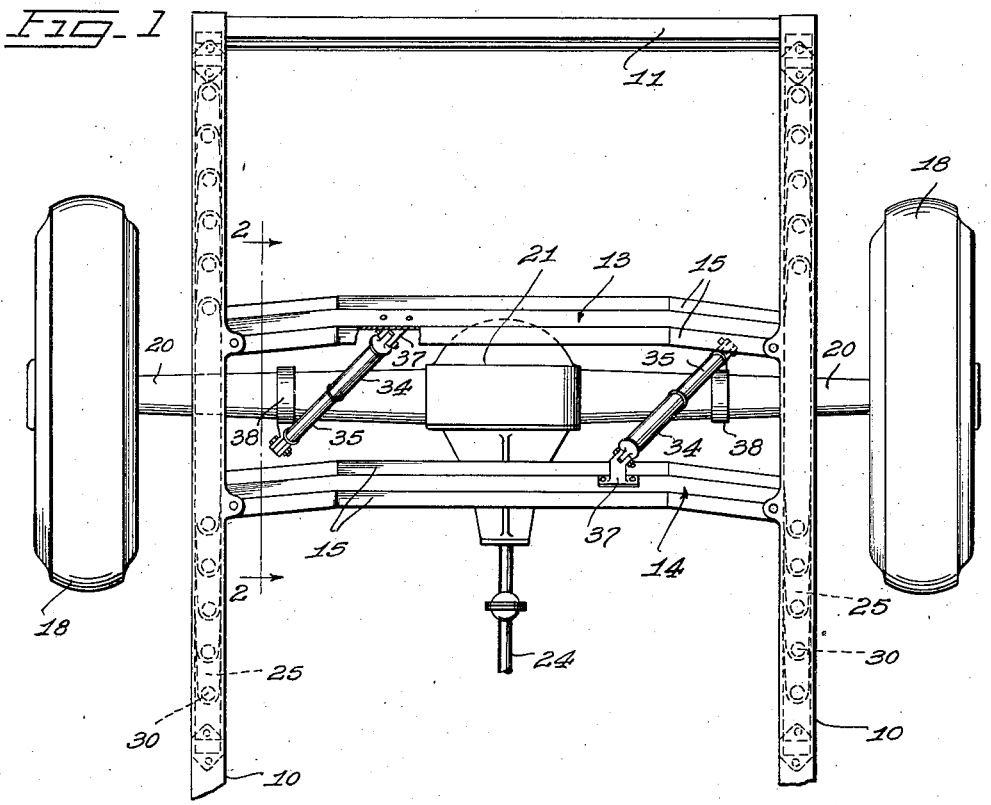
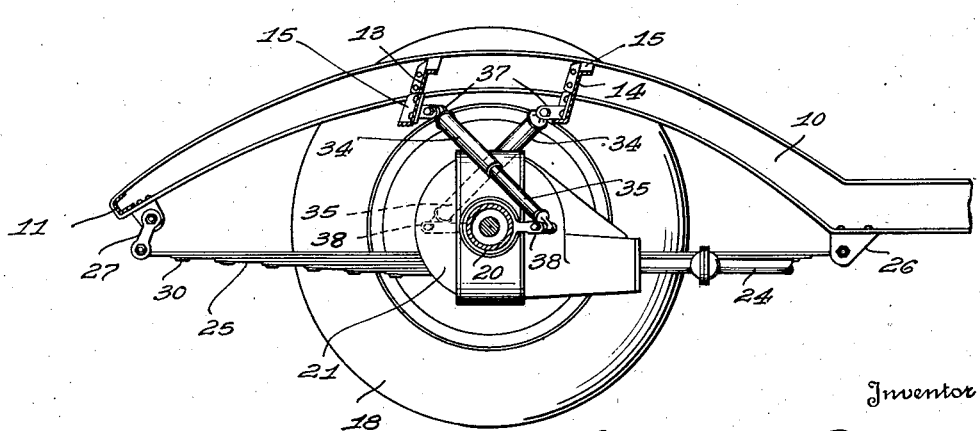

Aug. 26, 1941.  C. R. PATON  2,253,646
MOTOR VEHICLE
Filed May 7, 1938   2 Sheets-Sheet 2
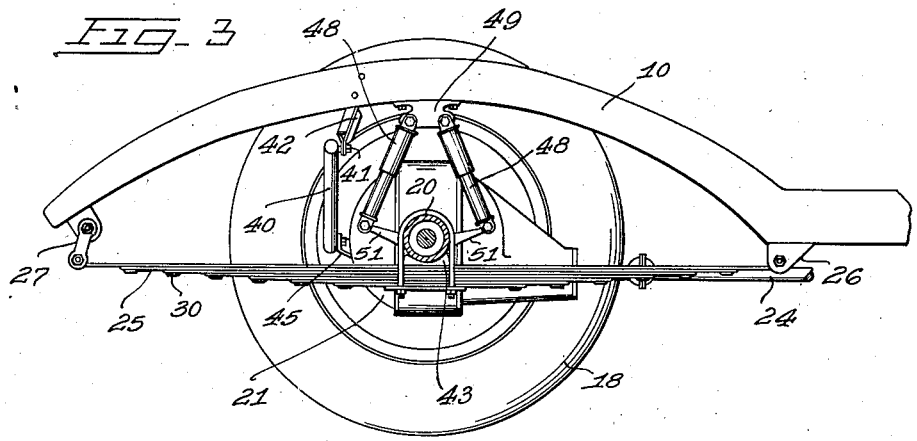
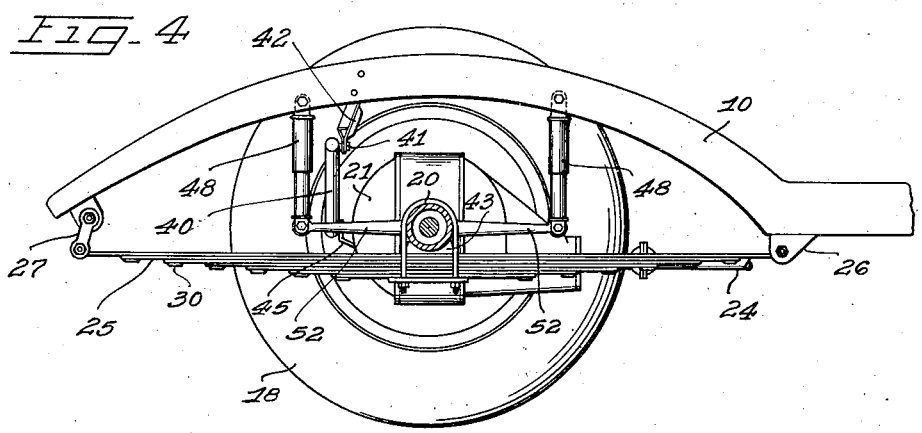
Inventor
Clyde R. Paton
By Watson, Cole, Grindle & Watson
Attorney Patented Aug. 26, 1941

2,253,646

UNITED STATES PATENT OFFICE 2,253,646

MOTOR VEHICLE

Clyde R. Paton, Birmingham, Mich., assignor to Packard Motor Car Company, Detroit, Mich., a corporation of Michigan Application May 7, 1938, Serial No. 206,647

5 Claims. (Cl. 267—11)

This invention relates to motor vehicles and is more particularly concerned with improvements in and relating to vehicle wheel suspensions. It is the principal object of the invention to promote riding comfort by minimizing undesirable movements of the vehicle body and by reducing vibration originating in the vehicle propulsion and suspension systems.

It is found that when a vehicle passes over an irregular road bed, so that one road wheel rises or falls abruptly with respect to the wheel on the opposite side, the vehicle body is thrust laterally. For example, when one wheel meets an obstacle and rises, the axle swings upwardly about the point of contact of the opposite wheel with the road bed. The longitudinal vertical planes passing through the points of connection of the oppositely disposed springs to the axle are thus brought closer together, and one or both of the springs must flex laterally. That spring which is the flatter of the two is more resistant to lateral flexure, and the body is displaced toward the opposite side, the opposite spring yielding laterally to permit such movement. The lateral impact thus applied to the body is usually severe owing to the edgewise stiffness of the conventional leaf spring assembly.

It has been proposed to employ rubber inserts between the spring leaves to reduce the static friction and stiff unyielding action characteristic of leaf springs, and to connect the springs to the body through rubber. This tends to reduce the shock of lateral displacement of the body incident to unequal flexure of the springs, the shock being somewhat cushioned, but increases the tendency of this lateral displacement to persist, the body tending to move to and fro at a frequency which is determined by the mass of the body and the lateral flexibility of the springs, the damping action normally resulting from interleaf friction having been largely removed by the use of the rubber inserts between the leaves.

Again, if the damping of the springs is decreased in a vehicle employing the well-known Hotchkiss type of drive, in which rotation of the rear axle housing about a transverse axis is resisted largely by the springs, axle rotation in response to braking or driving torque becomes more pronounced, with accompanying brake or clutch chatter. It is also found with springs of low damping characteristics that in driving over sand or snow, the wheels crawl upwardly on the soft surface, and as the vehicle weight breaks down this surface, the axle drops; this up and down motion rotates the axle, setting up vibrational disturbances in the clutch and brakes. Such chatter also results from the employment of low damped springs when the vehicle wheels bounce in passing over certain types of uneven road surface.

It is therefore an object of the invention to eliminate the lateral movement or float of the body and the vibrational disturbance and chatter just described by so connecting the frame with the driving parts including the axle and differential housings, independently of the springs, as to effectively resist or damp undesirable relative motion. More specifically, it is an object of the invention to so connect the frame and axle structure by shock absorbing devices that body float and chatter are either entirely eliminated or reduced to unobjectionable amplitude; preferably the construction is such that the same shock absorbing means suffices to resist both types of disturbance and performs in addition the more conventional function of resisting rapid accelerative vertical movement of the frame on the axle.

A further and more specific object of the invention is the provision of fluid shock absorbing devices between the frame and the rear axle means, which devices are effective in opposing rotation of the axle means in either direction about a transverse axis in response to driving or braking torque to the extent required to afford smooth operation and eliminate or materially reduce vibration, but without interference with the normal operation of vehicle springs of low damping.

Further objects and features of the invention will be apparent from the following description taken in connection with the accompanying drawings, in which:

Figure 1 is a plan view of the rear end of a motor vehicle chassis illustrating the application of the instant invention thereto;

Figure 2 is a longitudinal, sectional view taken substantially on the line 2—2 of Figure 1;

Figure 3 is a sectional view corresponding generally to Figure 2 but illustrating a modified form of the invention; and Figure 4 is a view similar to Figure 3 but illustrating a further modification.

In order to facilitate an understanding of the invention, reference is made hereinafter to the several embodiments thereof illustrated in the accompanying drawings and specific language is employed. It will nevertheless be understood that no limitation of the scope of the invention is intended thereby, but that various further modifications and alterations of the illustrated structure are contemplated such as would occur to one skilled in the art.

Dealing first with the form of the invention shown in Figures 1 and 2 of the drawings, it will be observed that these figures illustrate the rear end portion of a motor vehicle chassis, the usual side frame members, indicated at 10, being connected by a transverse member 11 at the rear of the vehicle and cross frame members 13 and 14 adjacent the rear axle. The members 13 and 14 may assume various structural forms and are illustrated as being generally Z-shaped in cross-section, these members being provided with flanges 15 at each end whereby they may be conveniently secured to the side frame members 10.

The road wheels 18 disposed at opposite sides of the frame, are carried on axle housings 20, the latter being secured rigidly to or formed integrally with a differential housing 21. It will be understood that the road wheels are driven through live axles within the housings 20 from gearing within the differential housing 21, this gearing being in turn driven from a drive shaft 24, which shaft extends forwardly to the vehicle power plant. The drive may be of the well-known Hotchkiss type which employs no torque tube about the drive shaft, universal joints being interposed in the drive shaft adjacent the differential housing and the power plant, in which system of drive the braking and driving torque on the axle and differential housings is resisted solely by the vehicle suspension springs.

The suspension system illustrated includes leaf springs 25, one of which is disposed at each side of the vehicle and is secured at its forward end to a spring hanger 26 and at its rearward end to a shackle 27, the springs 25 lying beneath and being thus connected with the side frame members 10. Intermediate its ends each spring is secured to an axle housing 20 in the conventional manner.

In the practice of my invention, I prefer to employ leaf spring assemblies in which the damping of spring flexure, both vertical and lateral, is relatively low. One such assembly is described in my copending application Serial No. 197,476, filed March 22, 1938, the detailed construction being claimed more specifically therein; for the purposes of the present application it suffices to state that the spring action is modified to afford a flat ride, and the spring assembly may be described as offering relatively low damping, particularly with respect to vertical flexure resulting from rapid wheel movements of large amplitude. The improved characteristics of the assembly are obtained by the use of bearings or bearing means intermediate the several spring leaves, the bearing means preferably comprising inserts 76 of rubber, self-lubricating bronze, lead alloys, and like materials. These inserts may be received in depressions 75 formed in the tip portions of the several leaves of the spring, and serve to space the adjacent leaves throughout a portion of their length. By suitable selection of the materials of which these inserts are composed and of their disposition between the several spring leaves, I am enabled readily to adjust the spring characteristics. By the employment of inserts of rubber, or other materials which substantially eliminate interleaf friction, between the longer leaves of the assembly, I am enabled not only to materially reduce the damping of vertical wheel movements, but I thereby reduce the resistance of the spring assembly to lateral flexure.

The structure thus far described forms no part of the instant invention except to the extent that certain details of the construction may cooperate with other features hereinafter described to improve the action of the vehicle suspension. Thus while in any vehicle employing the Hotchkiss type of drive the rear axle and differential housings tend to rotate about a transverse axis in response to the application of braking or driving torque thereto, as hereinbefore explained, this tendency is much more pronounced when the damping of the springs is reduced, for example, by the use of rubber or anti-friction devices between the leaves. Again, by reducing the friction between the spring leaves and to some extent by the employment of rubber connections between the springs and the frame, also disclosed in the aforesaid copending application, the lateral stability of the frame may be decreased and what is known as body float tends to persist. It is the purpose of the structure hereinafter described to prevent or reduce chatter and body float and this structure is therefore particularly applicable to vehicles in which the suspension may be described as one of low damping, regardless of the method by which the damping is reduced.

In the form of the invention shown in Figures 1 and 2, the preferred structure comprises fluid shock absorbers which are so connected between the axle means and the frame as to effectively damp body float and chatter and in addition to perform the usual function of shock absorbers in retarding rapid vertical acceleration of the body on the axle. The shock absorbers illustrated are of the fluid, extensible type, each shock absorber comprising a generally tubular member 34 and a member 35 extending within and telescoping with the member 34. In this type of shock absorber the member 34 ordinarily functions as a cylinder and the member 35 as a piston operable in the cylinder, and by suitable valving of the fluid past the piston as the member 35 moves into and out of the member 34, the degree of resistance to such movement in either direction may be accurately regulated. Thus it is common practice to so adjust a shock absorber that on the compression stroke, that is when the wheels tend to rise, less resistance is offered than on the rebound stroke, when the body moves upward as the result of the previous compression of the vehicle springs. This type of shock absorber is well-known and the details thereof form no part of the present invention.

Two or more shock absorbers of this type are preferably used and connection of these shock absorbers to the axle and the frame may be effected in any convenient manner. For example, brackets 37, one secured to each of the cross frame members 13 and 14 may be pivotally connected to the members 34 of the respective shock absorbers, and brackets 38, secured to the axle housings 20, may be pivotally connected to the members 35 of the respective shock absorbers. As will be apparent from the drawings, the shock absorbers are so disposed that the longitudinal axes thereof form acute angles with a horizontal plane and with a vertical plane containing the longitudinal axis of the vehicle. The shock absorber at one side of the vehicle extends upwardly toward the forward end of the vehicle, and the shock absorber at the other side of the vehicle extends upwardly toward the rearward end of the vehicle.

From the foregoing description it will be apparent that if the road wheels 18 and axle housings 20 rise or fall as a unit with respect to the frame, or if either road wheel rises or falls, the shock absorbers will function in the conventional manner to resist such vertical movement of the body, on either compression or rebound, to an extent which may be adjusted by suitable regulation of the valves within the shock absorbers. If the body should tend to move laterally on the axles, for example, in response to sudden upward movement of either road wheel, such lateral movement will likewise be resisted and damped by the shock absorbers, one shock absorber acting in compression and the other in rebound, so that adequate resistance is assured. Similarly if the axle housings 20 tend to rotate about a transverse axis, such rotation will tend to compress one shock absorber and extend the other, so that maximum resistance to such rotation is offered by one of the shock absorbers regardless of the direction of rotation of the axle housings. It will thus be appreciated that by the simple expedient of properly disposing and connecting the shock absorbers between the axle housings and the frame, suitable damping of undesirable vibrations and lateral body movements may be effected without further equipment than is normally required to damp only the vertical movements of the body.

It will also be noted that the disposition of the shock absorbers is such that there is a tendency to minimize rocking movement of the body about a longitudinal axis. For example, if the road wheel at the right of Figure 1 meets an obstruction and rises with respect to the frame, such movement will be resisted by the adjacent shock absorber, with the result that an upward thrust is imparted to the adjacent side of the body and a downward thrust is imparted to the axle housing 20. Since the shock absorber is connected to the axle housing at the rear of the latter, this last named thrust will tend to rotate the axle housing 20 about its transverse axis. The torque thus applied to the axle housing will impart an upward thrust to the shock absorber at the other side of the vehicle, thus tending to raise the body at such opposite side, the connection of such opposite shock absorber to the axle housing 20 being effected at the forward side of the latter. The body therefore tends to maintain a level position despite road irregularities.

Figure 3 illustrates a slightly modified form of the invention in which the suspension is similar to that illustrated in Figures 1 and 2, similar reference characters being employed to designate corresponding parts. In this form of the invention, however, the shock absorbers do not act to resist lateral movement of the frame; consequently it is advisable to stabilize the body against such lateral movement by other means. This may be conveniently done by a tie rod 40 which may be pivotally connected as at 41 to a bracket 42 secured to the side frame member 10, the tie rod being pivotally connected at its other end to a bracket 45 secured to the differential casing 21. It will be understood that this tie rod 40 may be connected to other relatively movable parts of the suspension; for example the lower end thereof may be connected between the side frame member 10 at one side of the vehicle and the axle housing 20 or the spring seat 43 at the other side.

In this form of the invention as in the form shown in Figures 1 and 2, the shock absorbers, designated at 48, are of the fluid, extensible type. Two shock absorbers are preferably employed at each side of the vehicle, each pair being pivoted at their upper ends to a bracket 49 which is in turn secured to the adjacent side frame member 10. The lower end of each of the shock absorbers 48 is pivotally connected to an arm 51, the arms 51 being secured rigidly to and extending forwardly and rearwardly respectively from the axle housings 20 adjacent the spring seat 43, the arms 51 preferably forming an angle of approximately 90° with the longitudinal axes of the shock absorbers 48 when the vehicle is normally loaded.

It will be observed that with this construction both shock absorbers 48 act to resist rising and falling movement of the road wheels in the conventional manner. In addition, if the axle and differential housings tend to rotate about a transverse axis, such rotation is retarded and damped by the action of the shock absorbers, at least one of which is actuated in a direction to afford the maximum resistance to such movement.

The form of the invention illustrated in Figure 4 of the drawings is quite similar to that shown in Figure 3, but may be employed where space permits for the purpose of increasing the leverage applied to the actuation of the shock absorbers on rotation of the axle housings. Thus in this modification the arms 52, which are rigid with the axle housings 20 and pivotally connected to the lower ends of the shock absorbers 48, extend substantially horizontally, the shock absorbers being disposed substantially at right angles to the arms 52 and being separately connected to the adjacent side frame member 10. The mode of operation is of course similar to that of the construction shown in Figure 3.

Having thus described the invention, what is claimed as new and desired to be secured by Letters Patent is:

1. In a motor vehicle, the combination with a vehicle frame, of road wheels disposed at opposite sides of said frame, axle means carrying said wheels, resilient means supporting said axle means and wheels on said frame for vertical movement and for limited lateral movement with respect thereto, and means acting between said frame and axle means to oppose relative lateral and vertical movements thereof and to oppose rotation of said axle means about a transverse axis, said last named means including longitudinally extensible shock absorbing devices connected to said axle means and said frame and disposed in acutely angled relation to a horizontal plane and to a vertical plane containing the longitudinal axis of the vehicle.

2. In a motor vehicle, the combination with a vehicle frame, of road wheels disposed at opposite sides of said frame, axle means carrying said wheels, resilient means supporting said axle means and wheels on said frame for vertical movement and for limited lateral movement with respect thereto, and means acting between said frame and axle means to oppose relative lateral and vertical movements thereof and to oppose rotation of said axle means about a transverse axis, said last named means including longitudinally extensible shock absorbing devices connected to said axle means and said frame and disposed in acutely angled relation to a horizontal plane and to a vertical plane containing the longitudinal axis of the vehicle, one of said devices extending upwardly in a forward direction and another of said devices extending upwardly in a rearward direction.

3. In a motor vehicle, the combination with a vehicle frame, of road wheels disposed at opposite sides of said frame, axle means carrying said wheels, resilient means supporting said axle means and wheels on said frame for vertical movement and for limited lateral movement with respect thereto, and means acting between said frame and axle means to oppose relative lateral and vertical movements thereof, said last named means including longitudinally extensible fluid shock absorbing devices connected to said axle means and said frame and disposed in acutely angled relation to a horizontal plane and to a vertical plane containing the longitudinal axis of the vehicle.

4. In a motor vehicle, the combination with a vehicle frame, of road wheels disposed at opposite sides of said frame, axle means carrying said wheels, resilient means supporting said axle means and wheels on said frame for vertical movement and for limited lateral movement with respect thereto, said resilient means comprising longitudinally extending leaf springs connected to said axle means and frame, said springs having bearing means including rubber interposed between certain of the leaves thereof, drive means for said road wheels including a longitudinally extending drive shaft permitting rotation of said axle means about a transverse axis, and means acting between said frame and axle means to oppose relative lateral and vertical movements thereof and to oppose rotation of said axle means about a transverse axis, said last named means including longitudinally extensible shock absorbing devices connected to said axle means and said frame and disposed in acutely angled relation to a horizontal plane and to a vertical plane containing the longitudinal axis of the vehicle, one of said devices extending upwardly in a forward direction and another of said devices extending upwardly in a rearward direction.

5. In a motor vehicle, the combination with a vehicle frame, of road wheels disposed at opposite sides of said frame, axle means carrying said wheels, resilient means supporting said axle means and wheels on said frame for vertical movement and for limited lateral movement with respect thereto, and means acting between said frame and axle means to oppose relative lateral and vertical movements thereof, said last named means including longitudinally extensible fluid shock absorbing devices connected to said axle means and said frame and disposed in acutely angled relation to a horizontal plane, to a vertical plane containing the longitudinal axis of the vehicle, and to a vertical plane perpendicular to the longitudinal axis of the vehicle.

CLYDE R. PATON.